United States Patent
Assaad (10) Patent No.: US 10,975,829 B2
(45) Date of Patent: Apr. 13, 2021

(54) SPARK PLUG COMBUSTION IONIZATION SENSOR

(71) Applicant: IC LLC, Troy, MI (US)

(72) Inventor: Kamal A. Assaad, Madison Heights, MI (US)

(73) Assignee: IC LLC, Troy, MI (US)

( * ) Notice: Subject to any disclaimer, the term of this patent is extended or adjusted under 35 U.S.C. 154(b) by 0 days.

(21) Appl. No.: 16/861,578

(22) Filed: Apr. 29, 2020

(65) Prior Publication Data

US 2020/0256308 A1    Aug. 13, 2020

Related U.S. Application Data

(63) Continuation of application No. 15/820,870, filed on Nov. 22, 2017.

(Continued)

(51) Int. Cl.
*G01N 27/70* (2006.01)
*F02P 13/00* (2006.01)
(Continued)

(52) U.S. Cl.
CPC .............. *F02P 13/00* (2013.01); *G01N 27/70* (2013.01); *H01T 13/32* (2013.01); *H01T 13/38* (2013.01);
(Continued)

(58) Field of Classification Search
CPC .................................. G01N 27/70; F02P 13/00
See application file for complete search history.

(56) References Cited

U.S. PATENT DOCUMENTS 2,571,507 A * 10/1951 Welch ..................... G01L 23/22
315/58
3,235,763 A * 2/1966 Candelise ............... H01T 13/50
313/134
(Continued)

FOREIGN PATENT DOCUMENTS

DE          3828518          3/1990
JP       57193777 A        11/1982

OTHER PUBLICATIONS

PCT International Preliminary Report on Patentability for PCT/US2017/063015.
(Continued)

*Primary Examiner* — Walter L Lindsay, Jr.
*Assistant Examiner* — Milton Gonzalez
(74) *Attorney, Agent, or Firm* — Dickinson Wright PLLC (57) ABSTRACT

A spark plug combustion ionization sensor for measuring ion current inside the cylinder of an internal combustion engine. The sensor measures ion current which flows when the energy released during combustion ionizes the air inside the cylinder, and thus can detect combustion and emission parameters. The spark plug combustion ionization sensor generally includes an insulated, dedicated sensing electrode, separate from the sparking electrode of a spark plug. The sensing electrode may also be shielded to further reduce interference such as electromagnetic interference (EMI). The use of a dedicated electrode allows for ion current measurement with less electromagnetic noise from the ignition process, and also eliminates the need for circuitry that is typically necessary when the sparking electrode is also used to sense ion current.

22 Claims, 12 Drawing Sheets

Related U.S. Application Data (60) Provisional application No. 62/425,127, filed on Nov. 22, 2016.

(51) Int. Cl.
  *H01T 13/41* (2006.01)
  *H01T 13/38* (2006.01)
  *H01T 13/32* (2006.01)
  *H01T 13/46* (2006.01)
  *F02P 5/15* (2006.01)
  *F02P 17/12* (2006.01)

(52) U.S. Cl.
  CPC ............ *H01T 13/41* (2013.01); *H01T 13/467* (2013.01); *F02P 5/1502* (2013.01); *F02P 2017/125* (2013.01)

(56) References Cited

U.S. PATENT DOCUMENTS

| | | | |
|---|---|---|---|
| 3,394,285 A | 7/1968 | Lindsay | |
| 4,361,036 A * | 11/1982 | Levenson | G01K 1/14 123/169 R |
| 5,180,983 A | 1/1993 | Murata et al. | |
| 5,731,654 A | 3/1998 | Benedikt | |
| 5,734,094 A | 3/1998 | Matsubara | |
| 6,094,990 A * | 8/2000 | Lykowski | G01L 23/22 73/35.12 |
| 6,759,796 B2 | 7/2004 | Klett | |
| 6,994,073 B2 * | 2/2006 | Tozzi | F02P 9/007 123/143 B |
| 9,035,541 B2 | 5/2015 | Yoshida | |
| 9,441,604 B2 | 9/2016 | Zheng | |
| 2005/0172636 A1 | 8/2005 | Ponziani | |
| 2007/0262721 A1 | 11/2007 | Camilli | |
| 2009/0189503 A1 | 7/2009 | Below | |
| 2010/0019643 A1 | 1/2010 | Kaiser | |
| 2011/0025186 A1 | 2/2011 | Kunitomo | |
| 2011/0101844 A1 * | 5/2011 | Glaser | F02P 13/00 313/141 |
| 2011/0184625 A1 | 7/2011 | Christ | |
| 2012/0019120 A1 | 1/2012 | Nakayama | |
| 2014/0159563 A1 | 6/2014 | Shibata | |

OTHER PUBLICATIONS

PCT International Search Report and Written Opinion for PCT/US17/63015.

* cited by examiner

SPARK PLUG COMBUSTION IONIZATION SENSOR

RELATED APPLICATIONS

This application claims priority to U.S. Non-Provisional application Ser. No. 15/820,870, filed Nov. 22, 2017, which claims benefit of U.S. Provisional Application 62/425,127, filed Nov. 22, 2016, the entire contents of which are incorporated herein by reference in their entirety.

FIELD

Exemplary embodiments in general relate to a spark plug combustion ionization sensor for in-cylinder combustion sensing in internal combustion engines.

BACKGROUND

Any discussion of the related art throughout the specification should in no way be considered as an admission that such related art is widely known or forms part of common general knowledge in the field.

Currently, spark plug-based ionization sensors use the sparking electrode of standard spark plugs to detect ionization in combustion chambers. This is typically done by circuits that are connected to the spark plugs to isolate and measure the ion current that flows during combustion.

Conventional sensors that use unmodified spark plugs typically result in masking or imperfect ion current signals generated during combustion. This occurs because of interference from the high voltage generated by the ignition coils that is applied to the sparking electrode to initiate combustion. In addition, conventional sensors use a circuit connected to the spark plug wire that operates simultaneously with the ignition system.

BRIEF SUMMARY

An exemplary embodiment is directed to a spark plug combustion ionization sensor. The spark plug combustion ionization sensor includes one or more dedicated ion current sensing electrodes. The dedicated electrode or electrodes can also be shielded and grounded to substantially reduce or eliminate interference from the high voltage applied to the sparking electrode of a spark plug to initiate the combustion process. Like the sparking electrode, the dedicated sensing electrode may typically extend from the upper portion of the spark plug, through the insulating body or a housing, such as a threaded metal housing, and into the combustion chamber. A sensing circuit can then be connected to the sensing electrode to monitor ion current in an engine's cylinder during combustion.

There has thus been outlined, rather broadly, some of the embodiments of the spark plug combustion ionization sensor in order that the detailed description thereof may be better understood, and in order that the present contribution to the art may be better appreciated. There are additional embodiments of the spark plug combustion ionization sensor that will be described hereinafter and that will form the subject matter of the claims appended hereto. In this respect, before explaining at least one embodiment of the spark plug combustion ionization sensor in detail, it is to be understood that the spark plug combustion ionization sensor is not limited in its application to the details of construction or to the arrangements of the components set forth in the following description or illustrated in the drawings. The spark plug combustion ionization sensor is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Exemplary embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Overview

An exemplary spark plug combustion ionization sensor generally comprises a housing, a threaded section that can be screwed into a tapped hole in a cylinder head of an internal combustion engine, a sparking electrode and a ground electrode. In addition, an exemplary sensor may have a dedicated ion current sensing electrode that is electrically isolated from (a) ground and (b) the sparking electrode. As shown in the figures, the sensing electrode may be positioned so that there will not be a spark generated between the two—in other words, so that the spark or sparks will only be generated between the sparking electrode and the ground electrode. This can be accomplished by the distance between the sensing electrode and the sparking electrode, or by different orientations of the electrodes, due to turbulence of the air-fuel mixture in the combustion chamber.

Figure 1A:
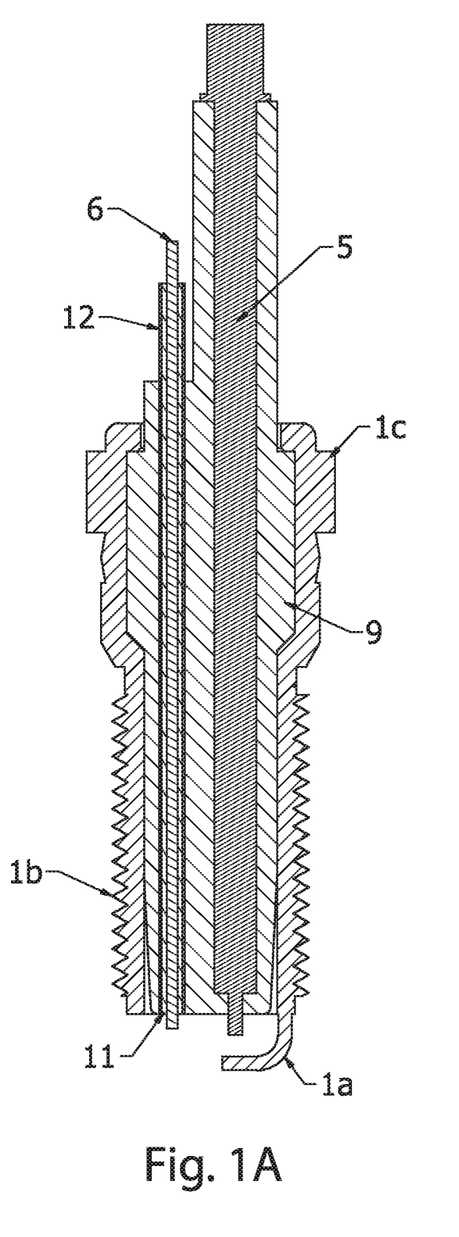
FIG. 1A is a cross section view of a spark plug combustion ionization sensor showing a dedicated ion sensing electrode.
Figure 1B:
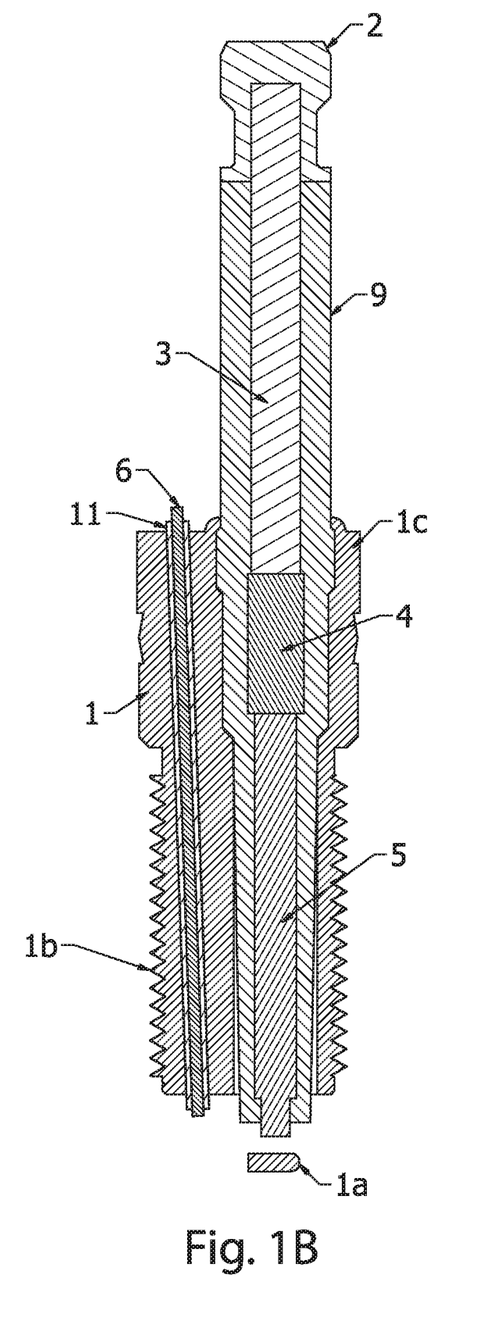
FIG. 1B is a cross section view of an alternate embodiment of a spark plug combustion ionization sensor showing a dedicated ion sensing electrode.
Figure 2A:
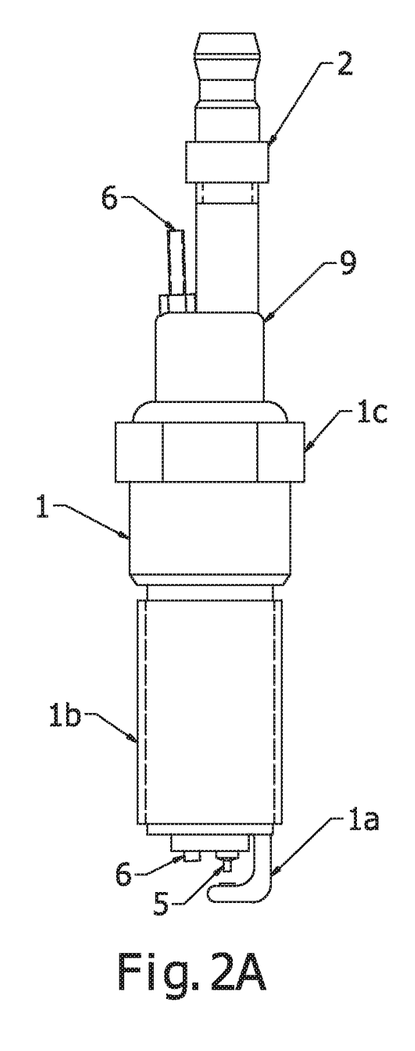
FIG. 2A is a front view of an alternate embodiment of the spark plug combustion ionization sensor with a dedicated ion sensing electrode.
Figure 2B:
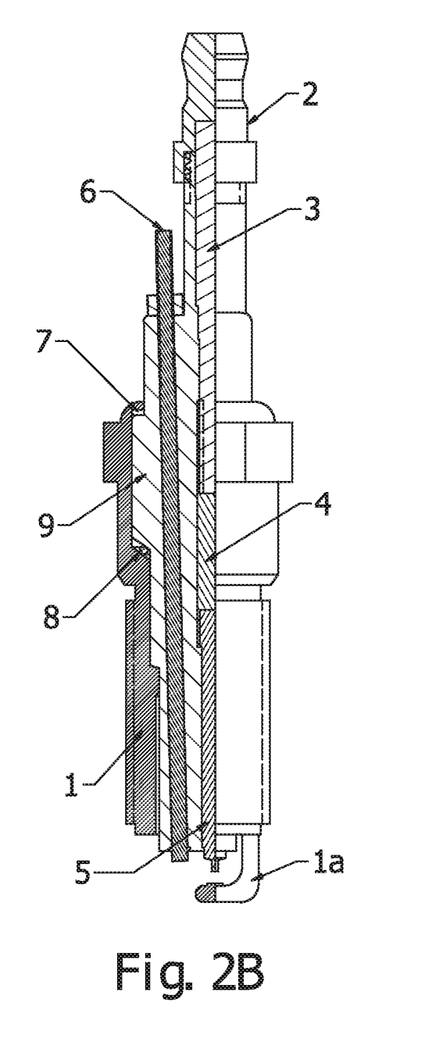
FIG. 2B is a cross section view of the spark plug combustion ionization sensor with a dedicated ion sensing electrode shown in FIG. 2A.
Figure 2C:
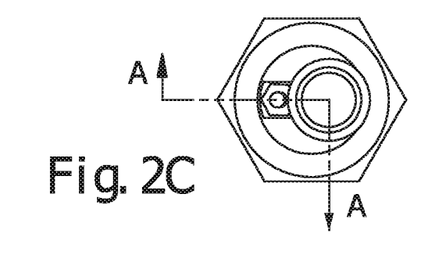
FIG. 2C is a top view of the spark plug combustion ionization sensor of FIGS. 2A and 2B.

With reference to the Figures, FIGS. 1 and 2 illustrate exemplary embodiments. In these embodiments, there is shown an outer shell (or housing) 1 that includes a threaded section 1b machined onto the outer housing for insertion into the tapped hole, as discussed above. The spark plug can be tightened to the proper torque with a standard size socket wrench engaged with hexagonal feature 1c of the outer housing. When the spark plug is installed, its housing 1 is seated against the engine's cylinder head by a tapered area or a compression washer (not shown). As with a conventional spark plug, seating the spark plug in the tapped hole creates a ground path for the ground electrode, which is in conductive contact with the threads and the spark plug seat.

The outer housing 1 surrounds insulating body 9, which is made of electrically insulating material, which can be, for example, ceramic (i.e., sintered alumina, alumina silicate, silicon nitride, or mixtures of ceramics). A thin metal sealing washer 7 and an elastic O-ring 8 may be positioned between the contact areas of the outer housing 1 and the insulating body 9 to seal in the combustion gases and maintain pressure inside the combustion chamber, as shown in FIG. 2B. Body 9 typically has high dielectric strength combined with good thermal conductivity. The body 9 can accommodate either a single-piece sparking electrode 5 (see FIG. 1A) or a multi-piece unit (e.g., FIGS. 1B and 2B) that incorporates a radio frequency noise-suppressing resistor 4 and also includes a metal connection terminal 2, a conductive rod 3, and a conductive, corrosion-resistant sparking electrode 5. Terminal 2 provides for a connection to ignition system 14 (FIG. 9) to the sparking electrode 5 through a standard snap-fit connector or a threaded connector.

Figure 3A:
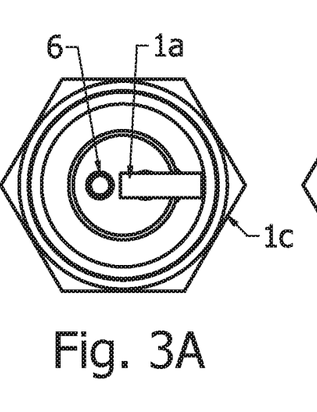
FIG. 3A is a bottom view of a spark plug combustion ionization sensor showing one possible orientation of the ground electrode.
Figure 3B:
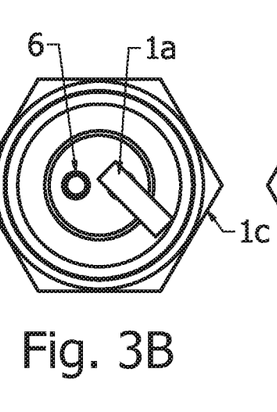
FIG. 3B is a bottom view of a spark plug combustion ionization sensor showing an alternative orientation of the ground electrode.
Figure 3C:
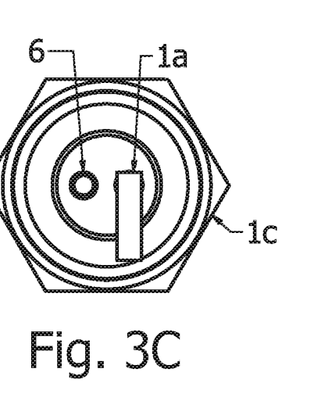
FIG. 3C is a bottom view of a spark plug combustion ionization sensor showing another alternative orientation of the ground electrode.

As also shown, the sensor spark plug also includes a J-shaped ground electrode 1a positioned to create a spark gap with the sparking electrode so that an ignition spark will be generated between the sparking electrode 5 and the ground electrode 1a to start the combustion process. FIGS. 3A-3C show different possible orientations of ground electrode 1a that are possible, and that may be used based on the in-cylinder turbulence generated by the tumble/swirl flow of the fuel-air mixture passing through the intake port of the engine.

Ion Current Sensing Electrode

Figures 4A, 4B, 4C:
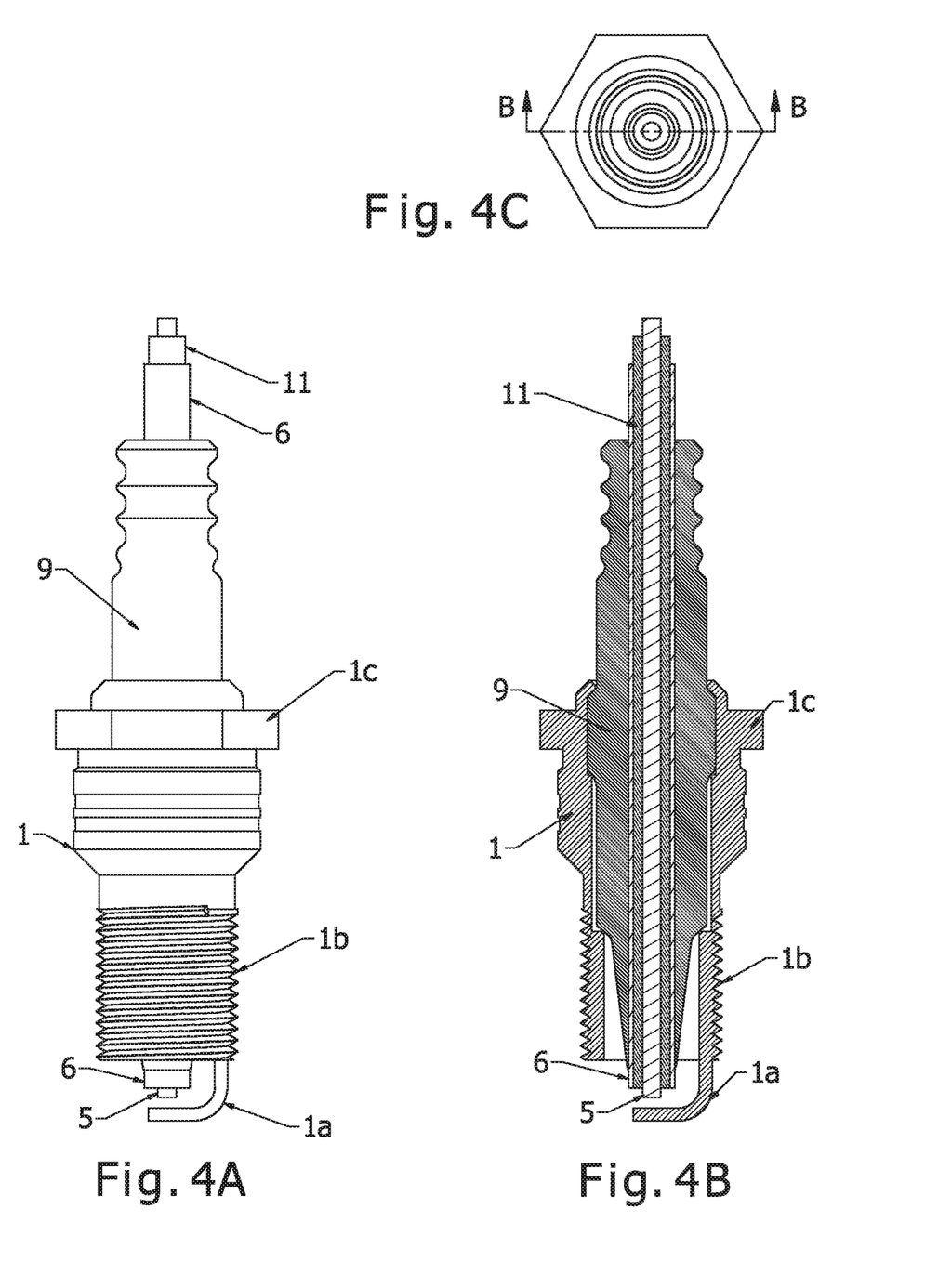
FIG. 4A is a front view of a spark plug combustion ionization sensor with a dedicated sensing electrode configured as a tube in a coaxial configuration.
FIG. 4B is a cross section view of a spark plug combustion ionization sensor with a dedicated sensing electrode configured as a tube in a coaxial configuration.
FIG. 4C is a top view of the spark plug combustion ionization sensor of FIG. 4A.
Figure 9:
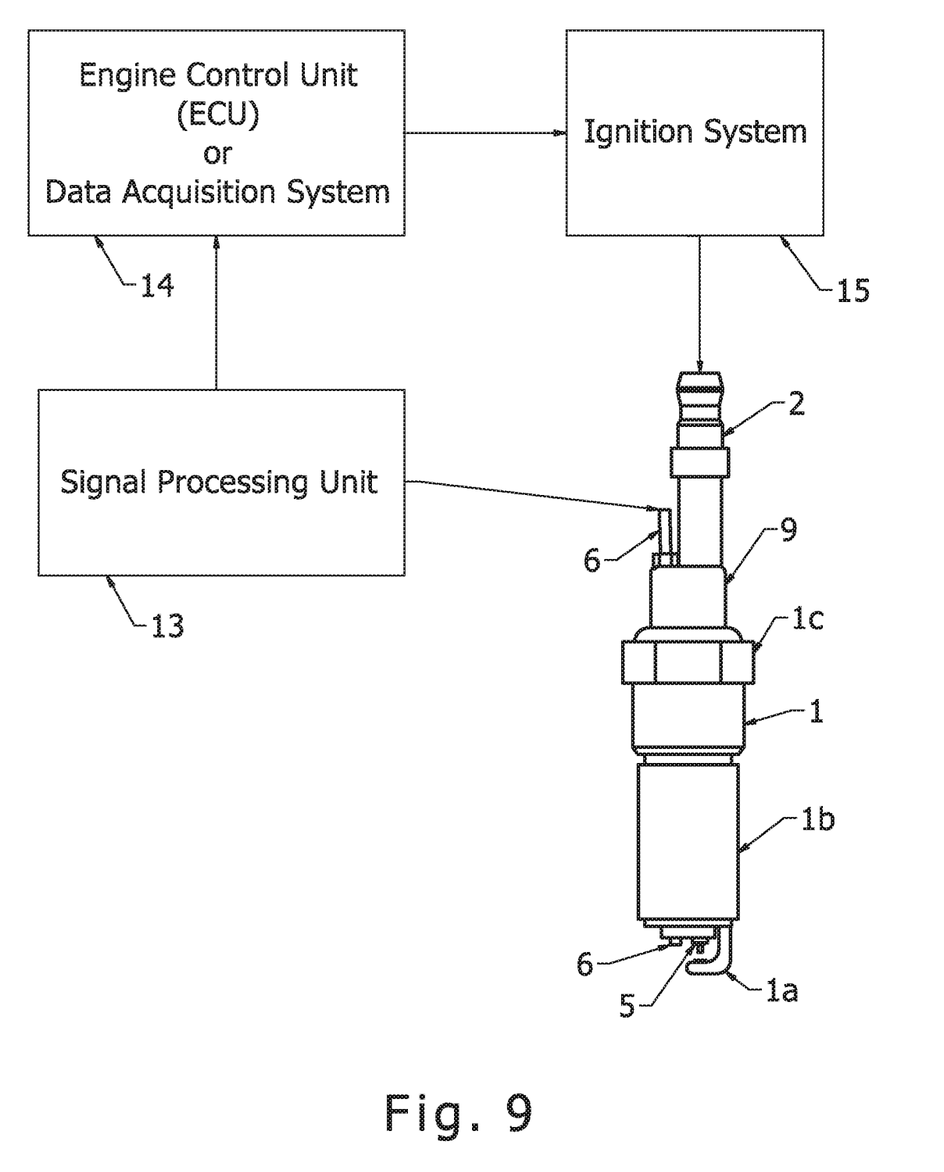
FIG. 9 is a schematic diagram of an interconnection of an exemplary spark plug combustion ionization sensor and associated circuitry/systems.

In addition to the components mentioned above, the exemplary embodiment of FIGS. 1 and 2 also includes a dedicated, electrically-insulated sensing electrode 6 that extends into the combustion chamber. Ion current sensing electrode 6 is electrically isolated from sparking electrode 5 and ground electrode 1a. Sensing electrode 6 can be made out of an electrically conductive material that extends on one end into the combustion chamber of an internal combustion engine, and can be connected at the other end to a signal processing unit 13 as shown in FIG. 9. Sensing electrode 6 can be a one-piece solid rod, or alternatively, it can be comprised of or connected to multiple elements such as a conductive rod, resistors, capacitors, or any set of components capable of carrying ion current through the body of the spark plug. In addition to the configuration shown in FIG. 1, the sensing electrode 6 can also be configured as a tube, as shown in FIGS. 4A-4C. In this embodiment, sensing electrode 6 can be arranged coaxially to surround sparking electrode 5, with an insulating tube 11 serving to electrically isolate the two elements.

Referring again to FIG. 1A, the dedicated sensing electrode 6 is surrounded by an insulating tube 11 or other insulating material, which in turn is surrounded by electromagnetic interference shield 12, which can be conductively coupled to ground. One possible way shield 12 can be coupled to ground is by laser welding to the outer housing 1. Such a weld could, for example, be used in FIG. 8 where the shield 12 exits the top of outer housing 1. In other configurations, such as that of FIG. 1A, where the shield is not necessarily adjacent to the outer housing, the shield can be grounded through an electrical connector, such as the electrical connector used to connect to the top end of sensing electrode 6. Shielding the sensing electrode 6 has the advantage of minimizing the electromagnetic noise imposed on the ion current signal during sparking, or from any other possible source.

FIG. 1B shows an alternate arrangement, where sensing electrode 6 is still positioned within an insulating tube 11 or is insulating using other insulating material, but the resulting assembly is contained within the outer metal housing 1 of the spark plug, which as discussed above, is grounded. In this embodiment, a separate shield surrounding the sensing electrode is not required, since the grounded housing acts as a shield. Either configuration (e.g., 1A or 1B) can substantially reduce or eliminate electromagnetic interference in the sensed ion current signal, which allows for more accurate and simplified measurement of combustion within the cylinder. Further, as shown in FIG. 1A, the sensing electrode 6 can be substantially parallel to the sparking electrode 5, or as shown in FIG. 1B, it can be at an angle to the sparking electrode if necessary to accommodate connectors or for better clearance with other parts of the spark plug.

Any number of known techniques can be used to make an electrical connection from the top of sensing electrode 6 to signal processing circuitry. For example, the top of electrode 6 can be configured to mate with a conventional automotive-type connector in order to allow wiring to a signal processing unit, such as signal processing unit 13 shown in FIG. 9.

Figure 7A:
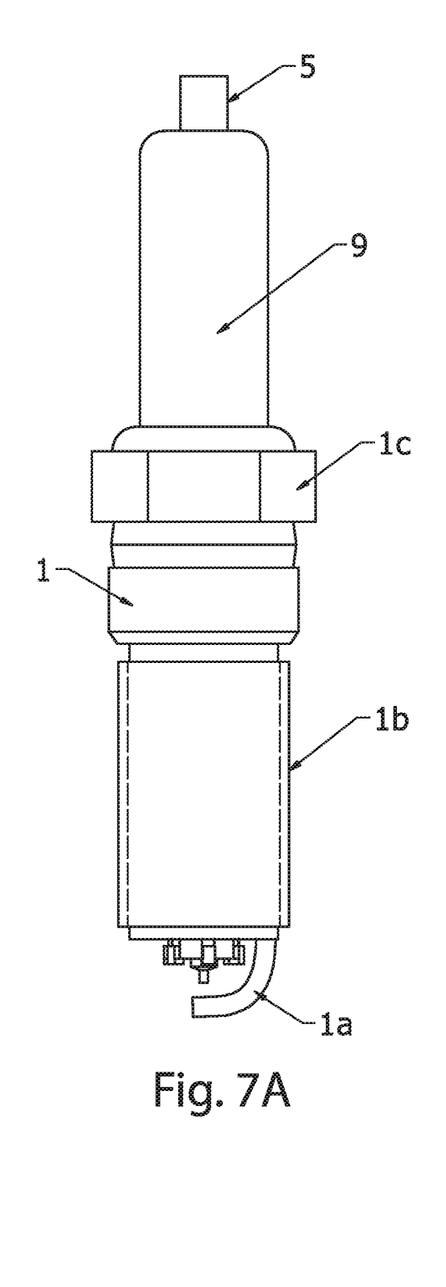
FIG. 7A is a front view of a spark plug combustion ionization sensor having multiple ion current sensing electrodes configured as lands.
Figure 7B:
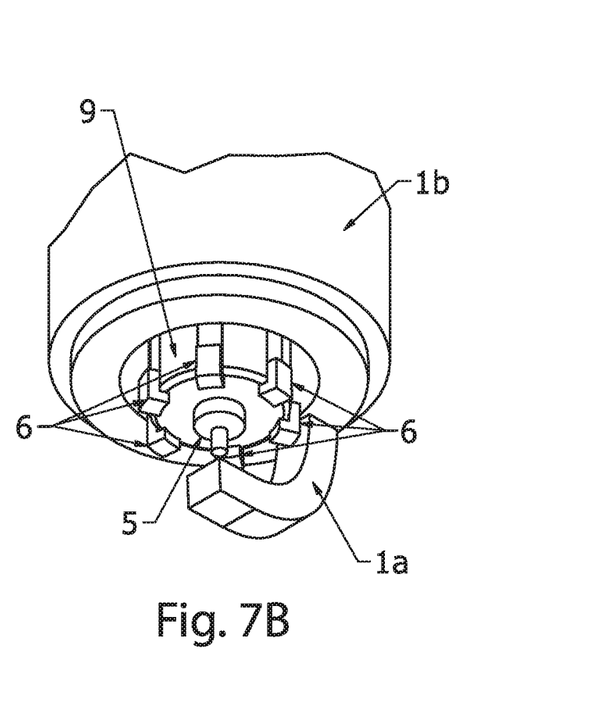
FIG. 7B is a detail perspective view of the spark plug combustion ionization sensor of FIG. 7A.

Other electrode configurations are possible. For example, as shown in FIG. 7B, multiple sensing electrodes 6 are arranged in a land-type configuration. In this embodiment, the sensing electrodes comprise conductive lands on the spark plug's insulating body with electrically conductive leads or other elements passing through or on body 9 to the top end of the spark plug, where they can be connected as described herein to sensing circuitry. The conductive lands that comprise sensing electrodes 6 may also be printed using an electrically conductive material or alloy on the outer surface of body 9.

Figure 5A:
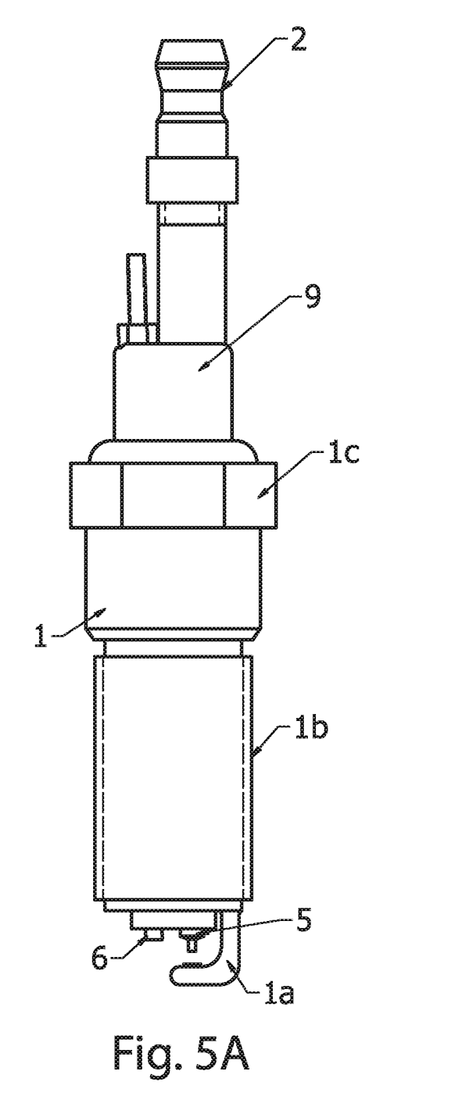
FIG. 5A is a front view of a spark plug combustion ionization sensor having multiple ion current sensing electrodes.
Figure 5B:
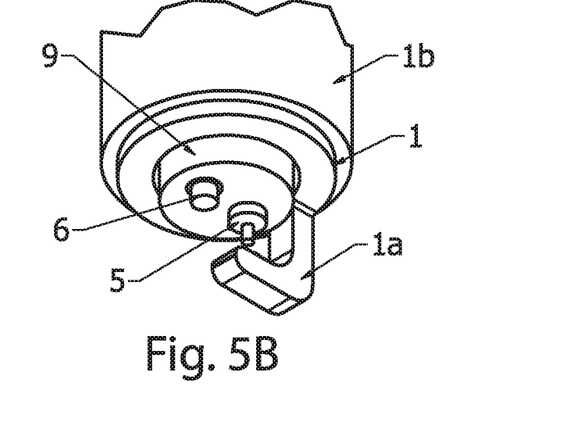
FIG. 5B is a detail perspective view of one end of a spark plug combustion ionization sensor.
Figure 5C:
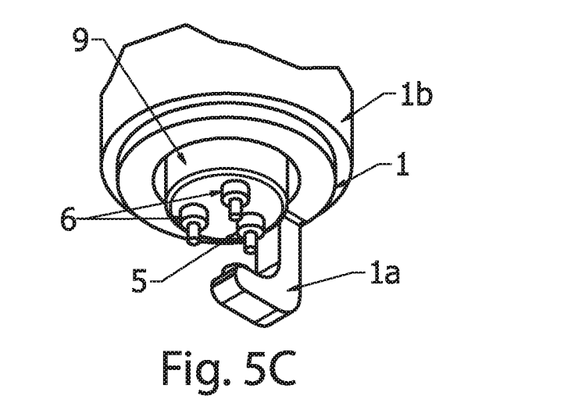
FIG. 5C shows an alternate embodiment of a spark plug combustion ionization sensor having multiple ion current sensing electrodes.
Figure 5D:
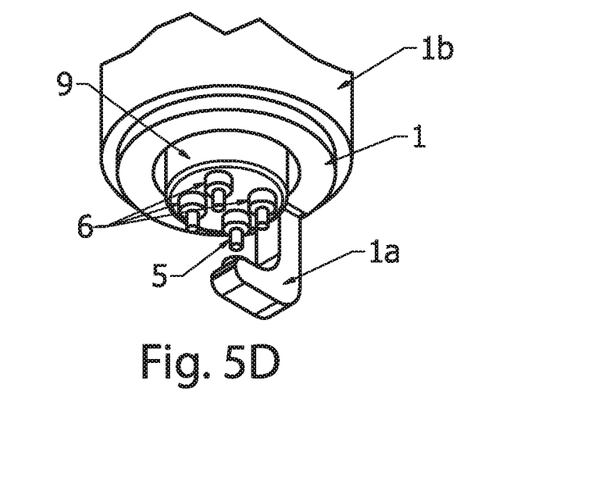
FIG. 5D shows another alternate embodiment of a spark plug combustion ionization sensor having multiple ion current sensing electrodes.
Figure 6A:
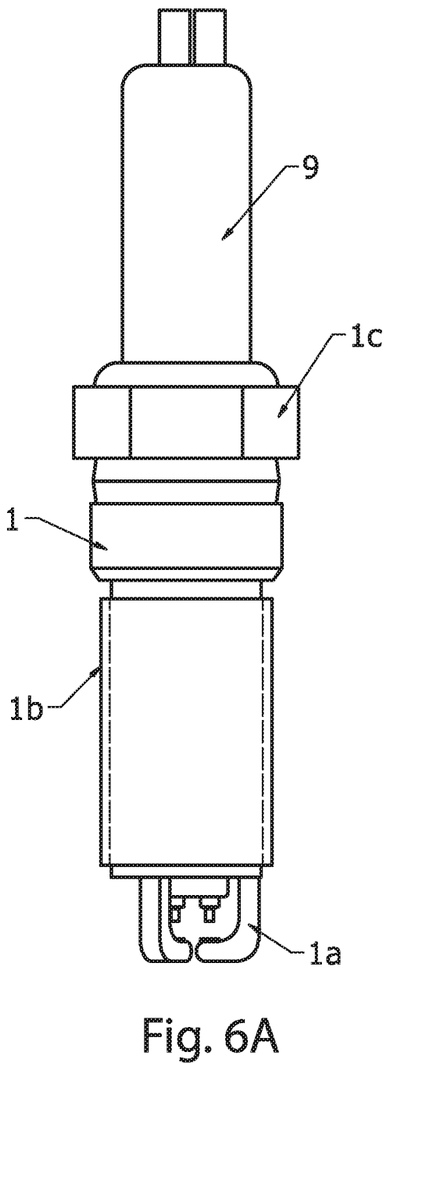
FIG. 6A is a front view of a spark plug combustion ionization sensor having multiple sparking electrodes.
Figure 6B:
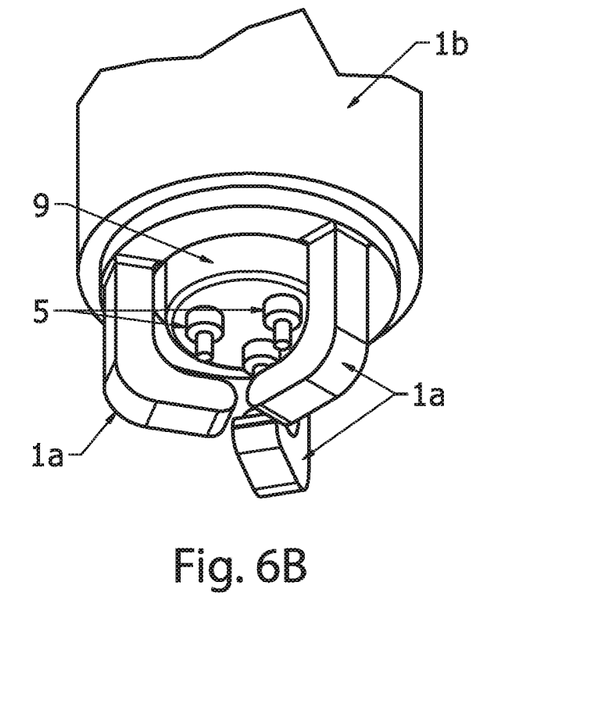
FIG. 6B is a detail perspective view of the spark plug combustion ionization sensor of FIG. 6A.

As also shown in FIGS. 5B-D, multiple sensing electrodes 6, rather than the single element shown in FIGS. 1 and 2, can also be used. In this embodiment, electrodes 6 pass through multiple holes in body 9. These holes and electrodes can be also used for multiple purposes, such as fuel injector nozzles or multiple sparking electrodes (as shown in FIG. 6B). Further, in a configuration with multiple sparking electrodes, some or all of the sparking electrodes can also be used for ion current measurement. One such embodiment is shown in FIG. 6B. In this embodiment, one or more of the sparking electrodes can be used as dedicated ion sensing probes, so that the electrodes are no longer used for sparking, but as discussed above with regard to other embodiments, can be used in conjunction with a signal processing unit such as signal processing unit 13 in FIG. 9, to measure ion current.

Figure 8:
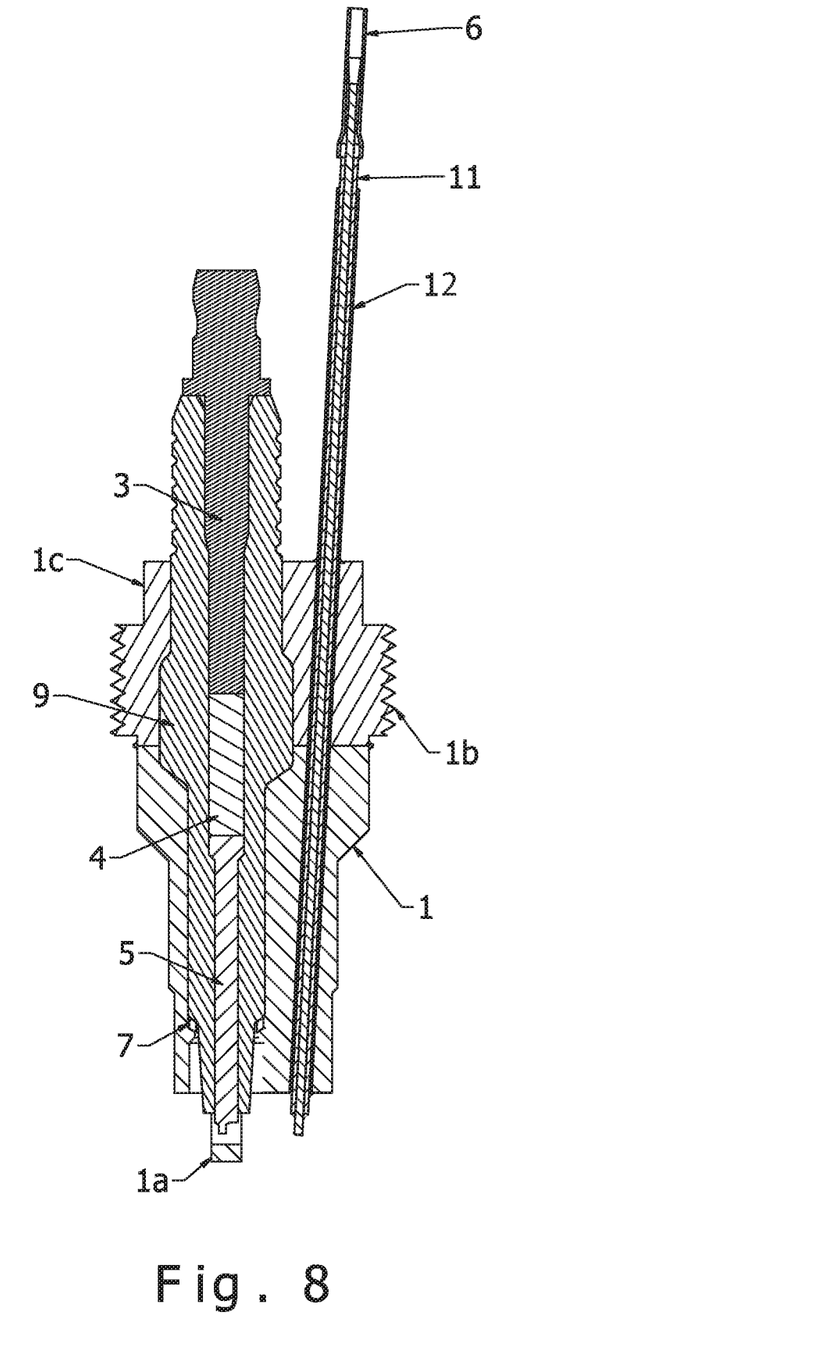
FIG. 8 is a cross sectional view of a spark plug combustion ionization sensor with an unconventional outer housing.

In some cases, it may be advantageous to modify the spark plug bore of the cylinder head in order to allow for an unconventional spark plug, as shown in FIG. 8. This would allow for installation of an ion sensor assembly with different shapes and designs, to ensure the integrity of the ion current signal without the space constraints of conventional spark plug shapes and sizes. The spark plug shown in FIG. 8 can still include all the basic elements discussed above regarding FIG. 1B.

Figure 13:
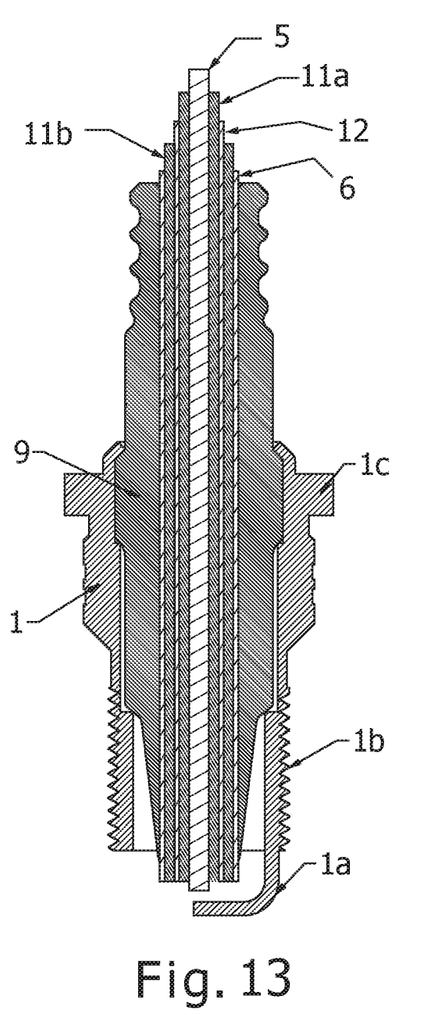
FIG. 13 is a cross section view of a spark plug combustion ionization sensor with a coaxial sensing electrode and shield.

As shown in FIG. 13, additional tubular elements can be added to an embodiment similar to FIG. 4. In this embodiment, the sparking electrode 5 is surrounded by insulator 11a, which in turn is surrounded by shield 12, which can be grounded. Another insulating layer 11b surrounds shield 12, which is further surrounded by sensing electrode 6, configured here as a tube as in FIGS. 4A-4C. In this embodiment, rather than surrounding an individual sensing electrode, shield 12 operates as a shield around the sparking electrode, so that even if multiple sensing electrodes are used, they will be shielded from electromagnetic noise.

Figure 14:
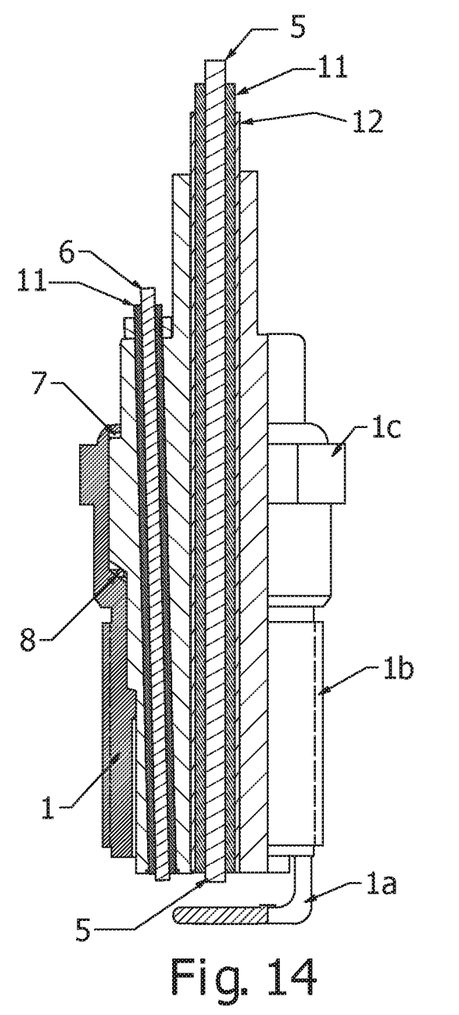
FIG. 14 is a cross section view of a spark plug combustion ionization sensor with a dedicated sensing electrode and a shielded sparking electrode.

In the exemplary embodiment of FIG. 14, the sparking electrode is also surrounded by an insulator 11 and shield 12. In this embodiment, a dedicated sensing electrode 6 can pass through the insulating body without the need for a shield immediately surrounding electrode 6, since the sparking electrode is shielded.

Operation of Preferred Embodiment

Referring to FIG. 9, in a typical spark-ignited internal combustion engine, an engine control unit 14 sends a spark timing command to the ignition system 15 of the desired engine cylinder to fire based on the firing order of the engine. Electric current flows to the sparking electrode 5 passing through the conducting rod 3 and the radio frequency noise cancelling resistor 4 (FIG. 1 embodiment) generating high voltage across the spark gap. A spark is then generated between the sparking electrode 5 and the ground electrode 1a when the voltage across the spark gap exceeds the dielectric strength of the air-fuel mixture within the spark gap, to initiate a flame kernel followed by the combustion process including flame propagation across the combustion chamber.

The energy released by the sparking and flame propagation ionizes the fuel-air mixture in the combustion chamber, producing ions and free electrons during the combustion process. To measure this combustion ionization, a DC or AC voltage can be supplied to the sensing electrode 6 to attract ions and electrons and complete the circuit between the insulated electrode and the engine block and/or in-cylinder multi-engine components. Electrons and negative ions are attracted to the positively charged electrode tip while positive ions are attracted to the ground electrode or any ground path present in the cylinder. This movement of electrons and ions results in closing the ionization circuit, allowing ion current to flow through a resistor with a known value in the signal processing unit 13. Ion current can be calculated in unit 13 by dividing the measured voltage across the resistor by the resistor value, or by other known means.

The ion current measured in this manner has a minimum of interference from the voltage generated to cause the ignition spark. For example, the ion current path is not the same path caused by the sparking electrode 5, and may flow from the sensing electrode to ground in a different location than the ground electrode of the spark plug. For this reason and due to the shielding of the dedicated sensing electrode, the ionization current produced by the dedicated electrode provides a more accurate representation of combustion events within the cylinder, relatively unaffected by the sparking electrode.

In the exemplary embodiments, an ion signal can be detected from the very first generation of free ions and electrons inside the combustion chamber through the sensing electrode without the interference of the electromagnetic noise generated by the ignition process. In cases of multi-sparking events where multiple sparks take place within the same engine cycle, the ion current signal can still be captured from start to finish with little or no interference from the ignition event.

Since the ion current signal is produced by ionizing the air-fuel mixture species depending on in-cylinder temperature, pressure, equivalence ratio and other operating parameters, it is possible to quantify the ionized species and obtain combustion and emission parameters using the measured ion current signal.

An in-cylinder combustion ionization signal obtained from the sensor can be used as a feedback signal to provide cycle-by-cycle and cylinder-by-cylinder control over the combustion process in internal combustion engines. Such control can be used to help engines meet stringent emission standards and also to achieve improved fuel economy. In addition, advanced combustion techniques such as lean homogeneous operation or lean stratified operation can be used successfully on engines using combustion feedback derived from the ion current signal. Combustion abnormalities such as engine knocking, misfires or late firing can also be detected with such a signal.

The various embodiments herein enable in-cylinder sensing such as the measurement of ion current signal through a dedicated electrically insulated probe introduced to the combustion chamber, without any interference from the ignition event caused by the high voltage generated by the ignition coils and applied to the sparking electrode to initiate combustion. Sparking operation can occur simultaneously with in-cylinder ion current sensing with minimum or no distortion to the shape of the ion current signal. The exemplary, dedicated ion current sensor also has the advantage of eliminating the need to use additional circuitry to separate or isolate the ion current signal from the spark generating voltage.

As discussed, since a single-purpose, isolated circuit can be used to measure ion current, the monitoring circuitry in signal processing unit 13 can be in operation continuously. For example, an AC or DC bias signal can be applied to one or more dedicated ion current sensing probes continuously, even when the spark command is present. Thus, as soon as conditions in the cylinder permit ion current flow, it can be measured by the sensing electrode and its associated circuitry in signal processing unit 13.

Figure 10:
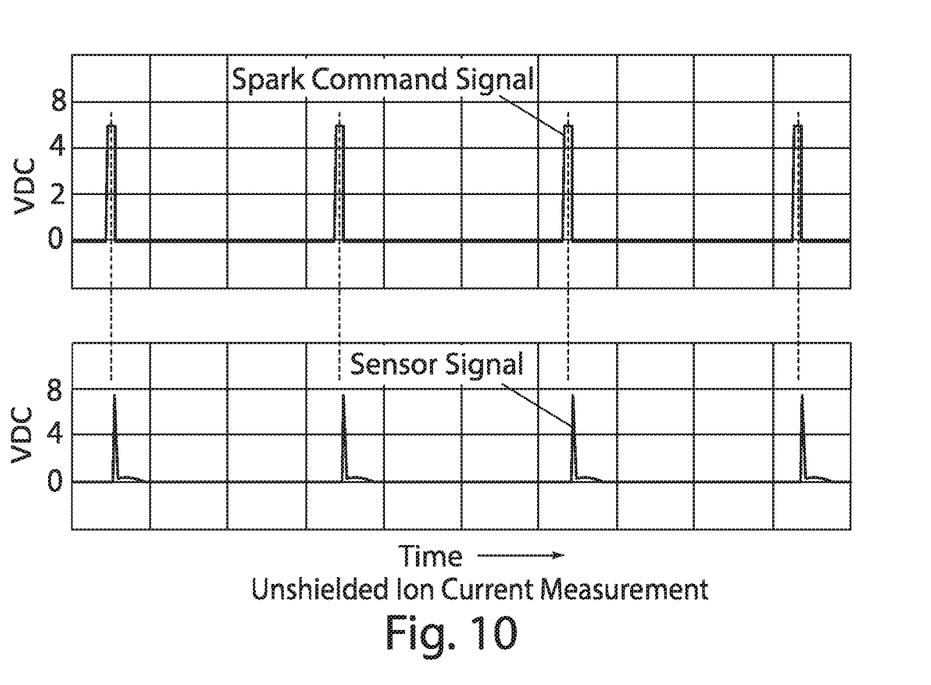
FIG. 10 illustrates experimental data showing the effect of electromagnetic interference on an exemplary unshielded ion current sensing electrode.
Figure 11:
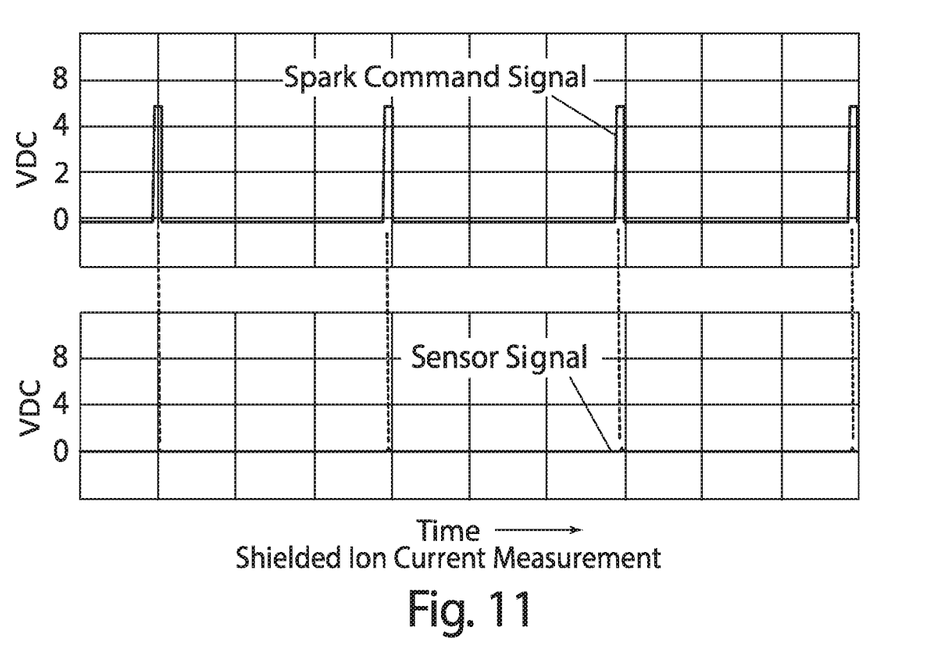
FIG. 11 illustrates experimental data showing the effect of electromagnetic interference on an exemplary shielded ion current sensing electrode.

Experiments have shown that it is advantageous to shield the electrically insulated ion current probe against electromagnetic interference from spark generation. Such shielding can be achieved by, for example, installing a metal tube around the electrically insulated sensing electrode, the metal tube also being conductively coupled to ground through the outer threaded housing. FIGS. 10 and 11 show data recorded during experiments to test the effect of electromagnetic interference from the sparking event on the ion current signal. In the experiment, a time-based ignition command was fed to the ignition system 15 of the spark plug without running the engine. A shielded and also an unshielded ion current measurement electrode was used. FIG. 10 shows the results using an unshielded ion sensing electrode. A false signal corresponding to spark generation can be clearly seen. Had the engine been running, this undesired signal would be imposed on the ion current signal, making it more difficult to accurately measure the ion current. FIG. 11 shows the voltage measured at the shielded probe, which illustrates the effectiveness of the shield, because little or no voltage caused by unwanted electromagnetic interference is present.

Figure 12:
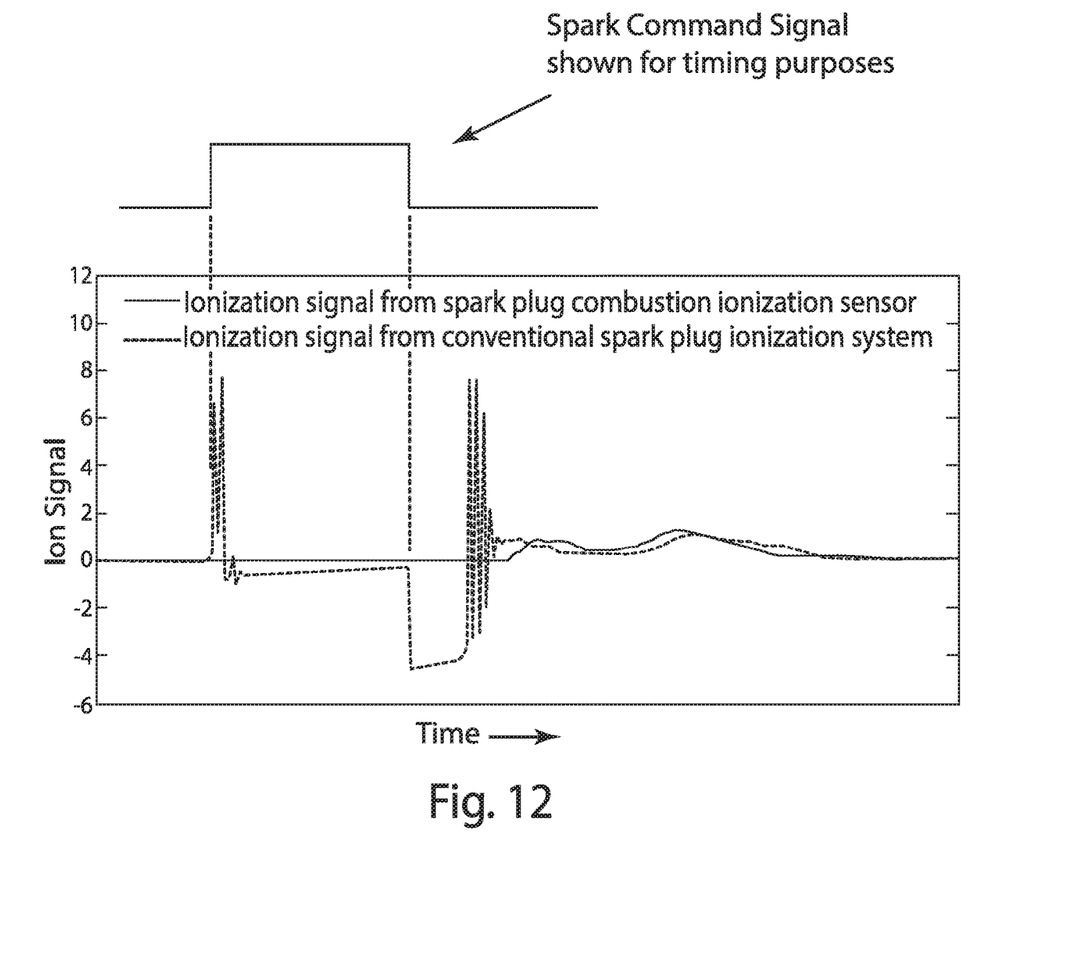
FIG. 12 illustrates a comparison of signals obtained from a shielded, dedicated ion current signal electrode and a conventional spark plug ionization system.

FIG. 12 illustrates a comparison of signals as they would be present in a running engine with respect to a conventional ionization measurement system and the various embodiments disclosed herein. The solid line shows the ion current signal from a shielded, dedicated sensor as disclosed in the exemplary embodiments discussed and illustrated here. The dotted line illustrates an ionization signal from a conventional spark plug ionization system, where the sparking electrode is also used as an ion current electrode. The unwanted current signal is typically present in any circuit arrangement because the same electrode and the same wire is used to carry the sensed current to the detection circuitry. As can be further seen in FIG. 12, the signal from the conventional ionization system has significant voltage present that is not due to only ionization within the cylinder, but also due to electromagnetic interference that may need to be accounted for in order to utilize the desired ion current signal. When using the signal from a conventional ionization system, the actual ionization current signal is masked by electromagnetic interference present from the sparking voltage. As can be seen in FIG. 12, it may be difficult or impossible to determine exactly when combustion (as indicated by ionization current) begins, due to voltage present from other sources in the detection circuit.

Unless otherwise defined, all technical and scientific terms used herein have the same meaning as commonly understood by one of ordinary skill in the art to which this disclosure belongs. Although methods and materials similar to or equivalent to those described herein can be used in the practice or testing of the spark plug combustion ionization sensor, suitable methods and materials are described above. All publications, patent applications, patents, and other references mentioned herein are incorporated by reference in their entirety to the extent allowed by applicable law and regulations. The spark plug combustion ionization sensor may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A spark plug, comprising:
a sparking electrode defining a longitudinal axis;
an electrically insulating body having a first end and a second end, wherein the electrically insulating body surrounds at least a portion of the sparking electrode, and wherein the sparking electrode has a distal end that is exposed at the first end of the electrically insulating body;
a housing surrounding a portion of the electrically insulating body, wherein the housing is adapted for mounting the spark plug in an engine cylinder head;
a ground electrode connected to the housing, wherein a distal end of the ground electrode is positioned to create a spark gap between the sparking electrode and the ground electrode;
a sensing electrode extending through either the housing or the electrically insulating body, wherein the sensing electrode is electrically isolated from the sparking electrode, wherein a distal end of the sensing electrode is exposed near the ground electrode, wherein the distal end of the sensing electrode is radially spaced away from the distal end of the sparking electrode; and
an electrically-conductive shield substantially surrounding the sparking electrode along its length and positioned between the sensing electrode and the sparking electrode, the electrically-conductive shield being electrically isolated from the sensing electrode and the sparking electrode, wherein the electrically-conductive shield substantially reduces electromagnetic interference in the sensing electrode.

2. The spark plug of claim 1, wherein the sensing electrode and the electrically-conductive shield extends through the electrically insulating body.

3. The spark plug of claim 2, further comprising an insulating layer positioned between the sensing electrode and the electrically-conductive shield.

4. The spark plug of claim 3, wherein the insulating layer substantially surrounds the sensing electrode along its length.

5. The spark plug of claim 1, wherein the electrically-conductive shield substantially surrounds the sensing electrode along its length.

6. The spark plug of claim 5, further comprising an insulating layer positioned between the sensing electrode and the electrically-conductive shield, the insulating layer substantially surrounding the sensing electrode along its length.

7. The spark plug of claim 1, wherein the sensing electrode and the electrically-conductive shield extends through the housing.

8. The spark plug of claim 7, further comprising an insulating layer positioned between the sensing electrode and the electrically-conductive shield, the insulating layer substantially surrounding the sensing electrode along its length.

9. The spark plug of claim 8, wherein the electrically conductive shield substantially surrounds a portion of the insulating layer along its length.

10. The spark plug of claim 7, wherein the electrically-conductive shield substantially surrounds the sensing electrode along its length.

11. The spark plug of claim 1, wherein the sensing electrode is electrically isolated from the ground electrode.

12. The spark plug of claim 1, wherein the electrically conductive shield is configured to be conductively coupled to ground.

13. The spark plug of claim 12, wherein the housing comprises a metal and wherein the electrically conductive shield is conductively coupled to the metal.

14. The spark plug of claim 1, wherein the distal end of the ground electrode is bent to project radially to a position axially below the sparking electrode.

15. The spark plug of claim 1, wherein the distal end of the ground electrode projects distally an axial distance greater than the distal end of the sensing electrode projects distally.

16. A spark plug, comprising:
a sparking electrode;
an electrically insulating body having a first end and a second end, wherein the electrically insulating body surrounds at least a portion of the sparking electrode, and wherein the sparking electrode exposed at the first end of the electrically insulating body;
a housing surrounding a portion of the electrically insulating body, wherein the housing is adapted for mounting the spark plug in an engine cylinder head;
a ground electrode connected to the housing, wherein the ground electrode is positioned to create a spark gap between the sparking electrode and the ground electrode;
a sensing electrode extending through either the housing or the electrically insulating body, wherein the sensing electrode is electrically isolated from the sparking electrode, wherein a portion of the sensing electrode is exposed near the ground electrode; and
an electrically-conductive shield positioned between the sensing electrode and the sparking electrode, the electrically-conductive shield being electrically isolated from the sensing electrode and the sparking electrode, wherein the electrically-conductive shield substantially reduces electromagnetic interference in the sensing electrode, wherein the electrically-conductive shield substantially surrounds the sparking electrode along its length.

17. The spark plug of claim 16, further comprising an insulating layer positioned between the sensing electrode and the electrically-conductive shield, and wherein the insulating layer substantially surrounds the sparking electrode along its length.

18. The spark plug of claim 17, further comprising a second insulating layer positioned between the electrically-conductive shield and the sparking electrode.

19. The spark plug of claim 16, further comprising an insulating layer substantially surrounding the electrically conductive shield along its length, wherein the sensing electrode is substantially tubular and is disposed between the insulating layer and the electrically insulating body.

20. The spark plug of claim 16, further comprising a first insulating layer substantially surrounding the sparking electrode along its length, and a second insulating layer substantially surrounding the sensing electrode along its length, wherein the electrically conductive shield substantially surrounds the first insulating layers along its length.

21. A spark plug for an internal combustion engine having a cylinder in which a hydrocarbon flame is generated during combustion, the spark plug comprising:
a sparking electrode defining a longitudinal axis;
an electrically insulating body having a first end and a second end, wherein the electrically insulating body surrounds at least a portion of the sparking electrode, and wherein the sparking electrode has a distal end that is exposed at the first end of the electrically insulating body;
a housing surrounding a portion of the electrically insulating body, wherein the housing is adapted for mounting the spark plug in an engine cylinder head;
a ground electrode connected to the housing, wherein the ground electrode is positioned to create a spark gap between the sparking electrode and the ground electrode;
a sensing electrode extending through either the housing or the electrically insulating body, wherein the sensing electrode is electrically isolated from the sparking electrode, a distal end of the sensing electrode being exposed near the ground electrode, the sensing electrode configured to sense an ion current of the hydrocarbon flame and send a signal indicative of a start of the ion current; and
an electrically-conductive shield substantially surrounding the sparking electrode along its length and positioned between the sensing electrode and the sparking electrode, the electrically-conductive shield being electrically isolated from the sensing electrode and the sparking electrode, wherein the electrically-conductive shield substantially reduces electromagnetic interference in the sensing electrode.

22. The spark plug of claim 21, wherein the distal end of the sensing electrode is shielded from electromagnetic interference from an arc between the sparking electrode and ground electrode by the electrically-conductive shield.

\* \* \* \* \*